Patented Mar. 16, 1926.

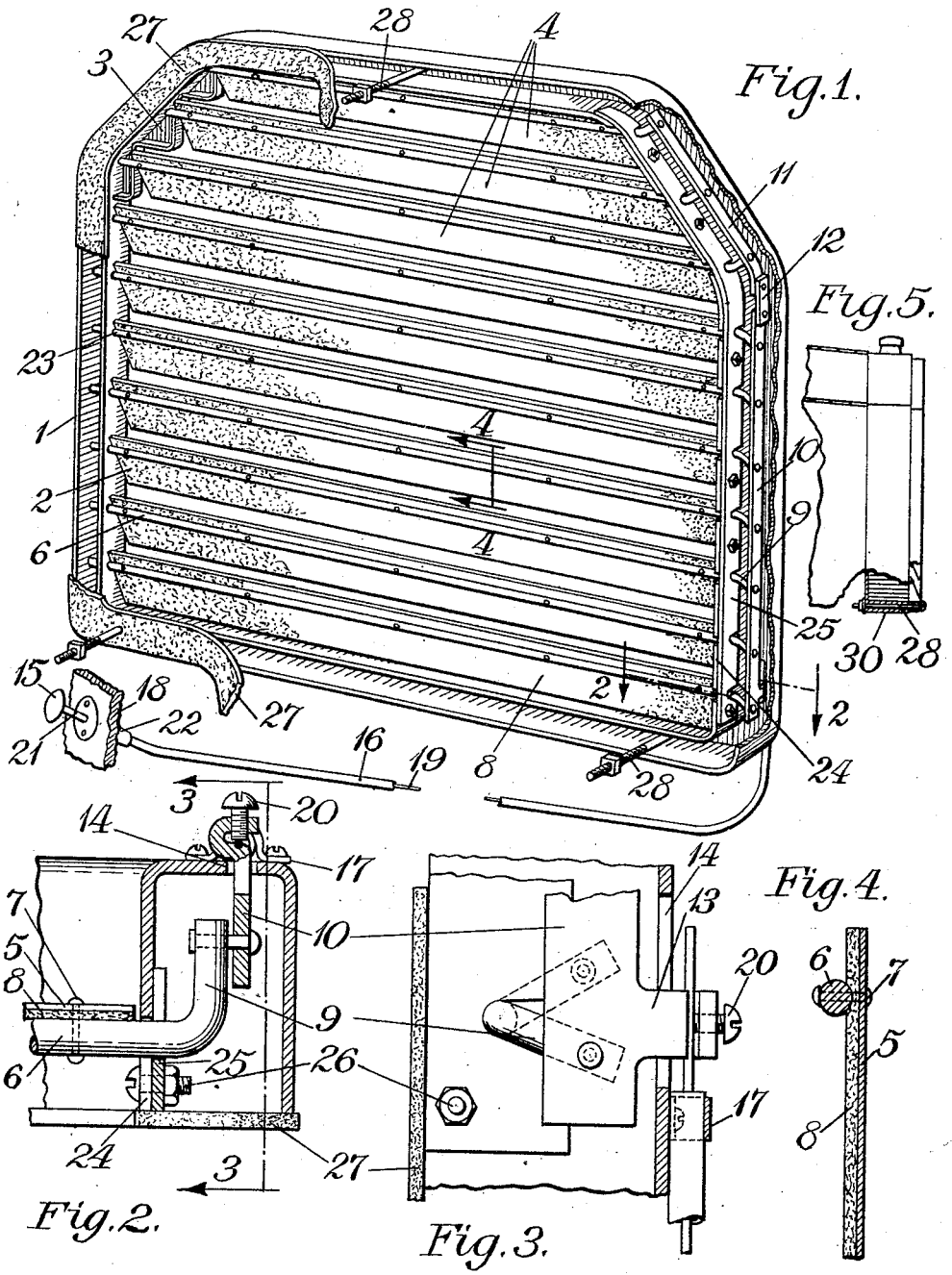

1,576,507

UNITED STATES PATENT OFFICE.

LAD ELIASEK, OF CHICAGO, ILLINOIS.

RADIATOR COVER.

Application filed January 13, 1922. Serial No. 528,983.

*To all whom it may concern:*

Be it known that I, LAD ELIASEK, a citizen of the United States, residing at Chicago, in the county of Cook and State of Illinois, have invented certain new and useful Improvements in Radiator Covers, of which the following is a specification.

My invention has reference particularly to a cover for automobile radiators wherein a number of shutters are mounted in a frame on the front of the radiator and adapted for adjustment so as to regulate the amount of air which is permitted to pass through the radiator.

The principal objects of my invention are to provide an improved frame for the radiator cover; to construct this frame so as to afford a compartment at the side for the mechanism which controls the operation of the shutters; to construct the frame so that it is convenient to attach to the radiator; to permit shutters of successively shortened length to be operated simultaneously with shutters of full length; and in general to provide an improved radiator cover of light weight, and simple construction whereby the admission of air to the radiator may be effectually controlled.

On the drawings—

Fig. 1 is a perspective view showing the rear of a radiator cover embodying my improvements;

Fig. 2, an enlarged sectional view on the line 2—2 of Fig. 1;

Fig. 3, a sectional view on the line 3—3 of Fig. 2;

Fig. 4, an enlarged sectional view of one of the shutters, taken on the line 4—4 of Fig. 1; and Fig. 5, a fragmentary view of the front end of an automobile showing my radiator cover secured thereto.

Referring to the drawing; the reference numeral 1 indicates the marginal frame of the radiator cover, this frame being preferably composed of a strip of sheet metal bent in a U-shape in cross section and formed into a marginal frame, corresponding to the shape of the radiator, in connection with which it is to be used. A number of shutters 5 extend between and are pivoted to the upright inner walls of the side portion of the marginal frame and the upper arched or converging portions of the frame has stepped inserts 3 at each side between which shutters 4 of reduced length extend.

Each of the shutters consists of a long plate which is secured to a rod 6 by rivets 7 or other suitable fastening, and these rods are preferably located nearer to the upper edge of the shutter plate 5 than to the lower edge as is indicated in Fig. 4, and the opposite ends of the rod 6 are pivoted in the inner walls of the side portion of the marginal frame 1, so that when the shutters are closed, the lower end of each shutter overlaps the upper end of the shutter immediately therebelow. The shutters preferably have a layer 8 of felt or other fabric secured on the rear face to afford a warm covering for the radiator and insure a tight closure between the overlapping portions of the shutters when the latter are closed.

Each of the rods 6 of the shutters 4 and 5 has a crank arm 9 at the end within the channel of the side frame and an operating member, likewise housed within the channel of the side frame, is connected to all of the crank arms 9, so as to operate all of the shutters 4 and 5 simultaneously. This operating member comprises the upright bar or rod 10, which is connected to all of the crank arms 9 of the shutters 5 and a separate rod or bar 11 arranged in the upper angular portion of the side channel and connected with all of the crank arms 9 of the shutters 4. The bars 10 and 11 are connected by means of a link 12 which is loosely pivoted at its opposite ends to the bars 10 and 11 respectively, so as to permit the necessary loose movement, which is required by reason of the difference in the direction of operating movement of the bars 10 and 11 and at the same time this link affords a connection which insures simultaneous operation of the rods 10 and 11 for simultaneously operating the shutters 4 and 5.

At the lower end of the bar 10, an extension 13 thereof projects forwardly through a slot 14 in the front wall of the marginal frame of the radiator cover and a Bowden cable is connected to this extension 13 and has the opposite end provided with an operating handle 15 on the instrument board of the car or at other convenient point for operating the shutters 4 and 5. This Bowden cable consists of a tube 16 which has one end clamped or otherwise secured in a fixed manner to the radiator cover frame as at 17 and at the other end secured to the instrument board 18 or other fixed portion of the car, and the wire 19 which extends through the tube 16 has one end projecting from the tube 16 and secured to the extension 13 by the clamping screw 20, or other suitable fastening, whereas the other end of the wire 19 is secured to the inner end of the stem 21 of the handle 15, which stem is mounted to reciprocate in the tubular housing 22.

For mounting the shutters 4 and 5 in the marginal frame 1, the inner wall thereof at one side is provided with a number of perforations 23 to receive the plain ends of the rods 6, and the inner wall of the marginal frame at the opposite side is provided with slots 24 to receive the crank ends of the rods 6, which are held in place by a reversely slotted plate 25 which is bolted on to the slotted wall of the marginal frame as at 26.

This radiator cover, as previously indicated, is constructed so as to conform to the shape of the radiator, in connection with which it is to be used and is clamped directly against the front of the radiator shell with the open side of the channel frame 1, against the front of the radiator shell, a strip of felt 27 being preferably interposed between the marginal frame 1 and the radiator shell to insure a tight fit without marring the radiator shell and to avoid rattling.

This radiator cover may be applied to the front of the radiator in any convenient manner, but I prefer to employ a number of bolts 28 which are passed between the radiator proper and the shell 30, within which it is enclosed, and nuts and washers are applied on the inner ends of these bolts so as to draw the radiator cover firmly against the outer face of the radiator shell.

When the radiator cover is applied as indicated and the Bowden cable connected up to the operating handle 15 on the dash, the shutters may be readily opened or closed by operating the handle 15, or set at any position of partial opening, and the loose connection 12 which is provided between the upright and angular portions of the operating member renders it possible to control shutters of successively shorter length simultaneously with the shutters of the regular length.

While I have shown and described my invention in a preferred form, I am aware that various changes and modifications may be made without departing from the principles of my invention, the scope of which is to be determined by the appended claims.

I claim as my invention:

1. In a radiator cover, the combination of a marginal frame extending around the edge of and adapted to be secured to the marginal shell of an automobile radiator, said frame having spaced side walls, a plurality of shutters extending between and pivotally mounted on the side walls, a crank arm on each shutter at the outer side of one of the side walls, an operating member connected to all of the crank arms for operating all of the shutters simultaneously, the lower shutters being substantially the same length and the upper shutters being shorter, said operating member comprising a bar connecting the cranks of the lower shutters, a bar connecting the cranks of the upper shutters and a compensating connection connecting the two bars and a housing on the marginal frame at the outer side of said side wall enclosing the crank arms and operating member.

2. In a radiator cover, the combination of a marginal frame having a hollow wall at one side thereof, a plurality of shutters extending between and pivoted on the side walls of the marginal frame, a number of said shutters being of successively shorter length, and an operating member within the hollow wall for simultaneously operating all of the shutters of equal length and having an angularly disposed extension in the hollow wall for operating the shutters of successively shorter length simultaneously with the shutters of uniform length.

3. In a radiator cover, the combination of a marginal frame having a hollow wall at one side and a space between the side walls diminishing in width at the top of the marginal frame, a plurality of shutters extending between and pivotally mounted on the side walls and of uniform length up to the point where the space between the side walls diminishes in width, and of successively decreasing length thereabove, an operating member in the hollow wall of the marginal frame connected with the shutters of uniform length, an angularly disposed operating member in the hollow wall connected with the shutters of successively decreasing length, and a loose link connection between the operating members for operating both sets of shutters simultaneously.

4. In a radiator cover, the combination of a marginal frame comprising a sheet metal blank bent in U-shape in cross section and forming an endless channel open at the rear, means for clamping the marginal frame against a radiator shell, a plurality of overlapping shutters pivotally mounted between the side portions of the marginal frame, and operating mechanism in the channel at one side of the marginal frame for simultaneously adjusting all of the shutters for controlling admission of air through the radiator.

5. In a radiator cover, the combination of a marginal frame, comprising a pair of spaced walls, a plurality of shutters extending between and pivotally mounted in slots in the inner walls of the marginal frame, a member secured to said inner wall and provided with oppositely disposed slots to prevent any excessive longitudinal movement of the crank arms and an operating member extending lengthwise between the inner and outer walls and connected with the crank arms for operating all of the shutters simultaneously.

6. In a radiator cover, the combination of a marginal frame substantially U-shaped in cross section, a wall of fibrous material bridging and closing the open portion of the frame and acting as a protective means between the marginal shell of the radiator and the cover, a plurality of horizontal shutters extending between the side portions of the frame, crank connections between the shutters enclosed in the frame and having an operating part extending through the front wall of the frame, and operating means connected to said part from beneath for simultaneously opening and closing all of the shutters.

LAD ELIASEK.